(12) United States Patent
Yamamoto

(10) Patent No.: US 11,911,946 B2
(45) Date of Patent: Feb. 27, 2024

(54) INJECTION MOLDING MACHINE AND INJECTION MOLDING METHOD

(71) Applicant: TOYOTA JIDOSHA KABUSHIKI KAISHA, Toyota (JP)

(72) Inventor: Yasuhiro Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/899,059

(22) Filed: Aug. 30, 2022

(65) Prior Publication Data

US 2023/0101195 A1 Mar. 30, 2023

(30) Foreign Application Priority Data

Sep. 28, 2021 (JP) .................................. 2021-157697

(51) Int. Cl.
| | |
|---|---|
| B29C 45/58 | (2006.01) |
| B29C 45/53 | (2006.01) |
| B29C 45/63 | (2006.01) |
| B29K 23/00 | (2006.01) |
| B29K 77/00 | (2006.01) |

(52) U.S. Cl.
CPC ............ *B29C 45/581* (2013.01); *B29C 45/53* (2013.01); *B29C 45/63* (2013.01); *B29K 2023/12* (2013.01); *B29K 2077/00* (2013.01); *B29K 2995/0012* (2013.01)

(58) Field of Classification Search
CPC .................................................. B29C 45/581
See application file for complete search history.

(56) References Cited

FOREIGN PATENT DOCUMENTS

| EP | 2051842 B1 * | 1/2012 | ............ B29C 45/18 |
| JP | 4817402 B1 * | 11/2011 | |
| JP | 2017-132039 A | 8/2017 | |
| JP | 2022-079146 A | 5/2022 | |

\* cited by examiner

*Primary Examiner* — Seyed Masoud Malekzadeh
*Assistant Examiner* — Timothy G Hemingway
(74) *Attorney, Agent, or Firm* — Sughrue Mion, PLLC

(57) ABSTRACT

An injection molding machine capable of changing the position of the supply hole of the resin material in a cylinder as appropriate is provided. An injection molding machine according to one aspect of the present disclosure includes: a supply hole through which a resin material is supplied to an inside of a cylinder, the supply hole being formed in a side wall part of the cylinder; and a closing part that, when a torpedo piston moves to a side of an other end part of the cylinder in order to plasticize the resin material, moves together with the torpedo piston and closes the supply hole.

8 Claims, 17 Drawing Sheets

INJECTION MOLDING MACHINE AND INJECTION MOLDING METHOD

CROSS REFERENCE TO RELATED APPLICATIONS

This application is based upon and claims the benefit of priority from Japanese patent application No. 2021-157697, filed on Sep. 28, 2021, the disclosure of which is incorporated herein in its entirety by reference.

BACKGROUND

The present disclosure relates to an injection molding machine and an injection molding method.

An injection molding machine disclosed in Japanese Unexamined Patent Application Publication No. 2017-132039 includes a barrel (a cylinder) having an end part in which an outlet is formed, a hopper connected to the barrel, a torpedo piston that is moved in the barrel and to which an end part of the rod is fixed, and a plunger that is arranged on a side of an open port of the barrel and through which a rod is made to pass.

When a molten resin is injected using the above injection molding machine, first, the plunger is moved toward a side of the barrel opposite to the side of the barrel where the outlet is provided in a state in which the plunger is fixed to the rod, a connection port of the barrel and the hopper (i.e., a supply hole of a resin material) is opened, and the resin material is supplied from the supply hole to a space in the barrel provided on the side of the plunger with respect to the torpedo piston.

Next, the state in which the plunger is fixed to the rod is released, the plunger is made to move toward the outlet of the barrel, the supply hole of the barrel is closed by the plunger, and the open port of the barrel is closed. In this state, the torpedo piston is made to move toward a side of the barrel that is opposite to the side of the outlet of the barrel in the barrel via the rod.

Then, the resin material passes groove parts in the torpedo piston and is plasticized to be a molten resin, and this molten resin flows into the space in the barrel on the side of the outlet with respect to the torpedo piston in the barrel. Then, the torpedo piston is made to move toward the outlet of the barrel and the molten resin is injected from the outlet.

SUMMARY

Applicant has found the following problem. The injection molding machine disclosed in Japanese Unexamined Patent Application Publication No. 2017-132039 has a structure in which the plunger blocks the supply hole of the barrel. In such a structure, for example, when the position of the supply hole is changed to the side of the outlet, an amount of protrusion of the plunger into the inside of the torpedo piston in the barrel is increased. Therefore, in the injection molding machine disclosed in Japanese Unexamined Patent Application Publication No. 2017-132039, it is not practical to change the position of the supply hole through which the resin material is supplied as appropriate.

The present disclosure has been made in view of the aforementioned problem and provides an injection molding machine and an injection molding method that are capable of changing the position of a supply hole through which a resin material is supplied (hereafter, the supply hole of the resin material) in a cylinder as appropriate.

A first exemplary aspect is an injection molding machine including:
- a cylinder configured to accommodate a resin material;
- a torpedo piston configured to move inside the cylinder to plasticize the resin material, to thereby form a molten resin, and then extrude the molten resin; and
- an injection part configured to inject the molten resin, the injection part being disposed in one end part of the cylinder, the injection molding machine further including:
- a supply hole through which the resin material is supplied to the inside of the cylinder, the supply hole being formed in a side wall part of the cylinder; and
- a closing part configured to, when the torpedo piston moves to a side of an other end part of the cylinder in order to plasticize the resin material, move together with the torpedo piston and close the supply hole.

In the above-described injection molding machine, the closing part may block the supply hole so that the softened resin material or the molten resin does not flow back from the supply hole.

In the above-described injection molding machine, the supply hole may be disposed at a position satisfying $(St-x)/St \leq \gamma$, where $St$ is a stroke amount of the torpedo piston from a bottom dead center to a top dead center, $\gamma$ is a preset filling rate of the resin material, and $x$ is a distance from the other end part of the cylinder to a position at a center of the supply hole.

In the above-described injection molding machine, the closing part may be formed on a side surface of the torpedo piston.

In the above-described injection molding machine, the closing part may be disposed on the side of the other end part of the cylinder relative to the torpedo piston.

In the above-described injection molding machine, the other end part of the cylinder may be open, and
the above-described injection molding machine may include a plunger configured to push, via the other end part of the cylinder, the resin material supplied to the inside of the cylinder.

The above-described injection molding machine may include:
- an exhaust hole configured to communicate a space in the cylinder on the side of the other end part thereof relative to the torpedo piston with an outside; and
- an insertion part configured to move together with the torpedo piston and be inserted into the exhaust hole to thereby block the exhaust hole when the closing part closes the supply hole.

In the above-described injection molding machine, the resin material may be a material of which a glass transition point is lower than that of polycarbonate.

In the above-described injection molding machine, the resin material may be a material of which a glass transition point is higher than that of polypropylene.

Another exemplary aspect is an injection molding method for moving a torpedo piston inside a cylinder to plasticize a resin material, thereby forming a molten resin, and then extruding the molten resin, the injection molding method including
closing, when the resin material is plasticized, a supply hole of the resin material by the closing part configured to move together with the torpedo piston, the supply hole being formed in a side wall part of the cylinder.

In the above-described injection molding method, the closing part may block the supply hole so that the softened resin material or the molten resin does not flow back from the supply hole.

According to the present disclosure, it is possible to provide an injection molding machine and an injection molding method that are capable of changing the position of the supply hole of the resin material in a cylinder as appropriate.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, specific embodiments to which the present disclosure is applied will be described in detail. However, the present disclosure is not limited to the following embodiments. Further, for the sake of clarification of the description, the following descriptions and the drawings are simplified as appropriate.

First Embodiment

First, a structure of an injection molding machine according to this embodiment will be described. The injection molding machine according to this embodiment is suitably used to additively manufacture a workpiece using a resin material of which the glass transition point is lower than that of ABS, polycarbonate (PC), or the like, such as polypropylene (PP) and polyamide (PA).

Figure 1:
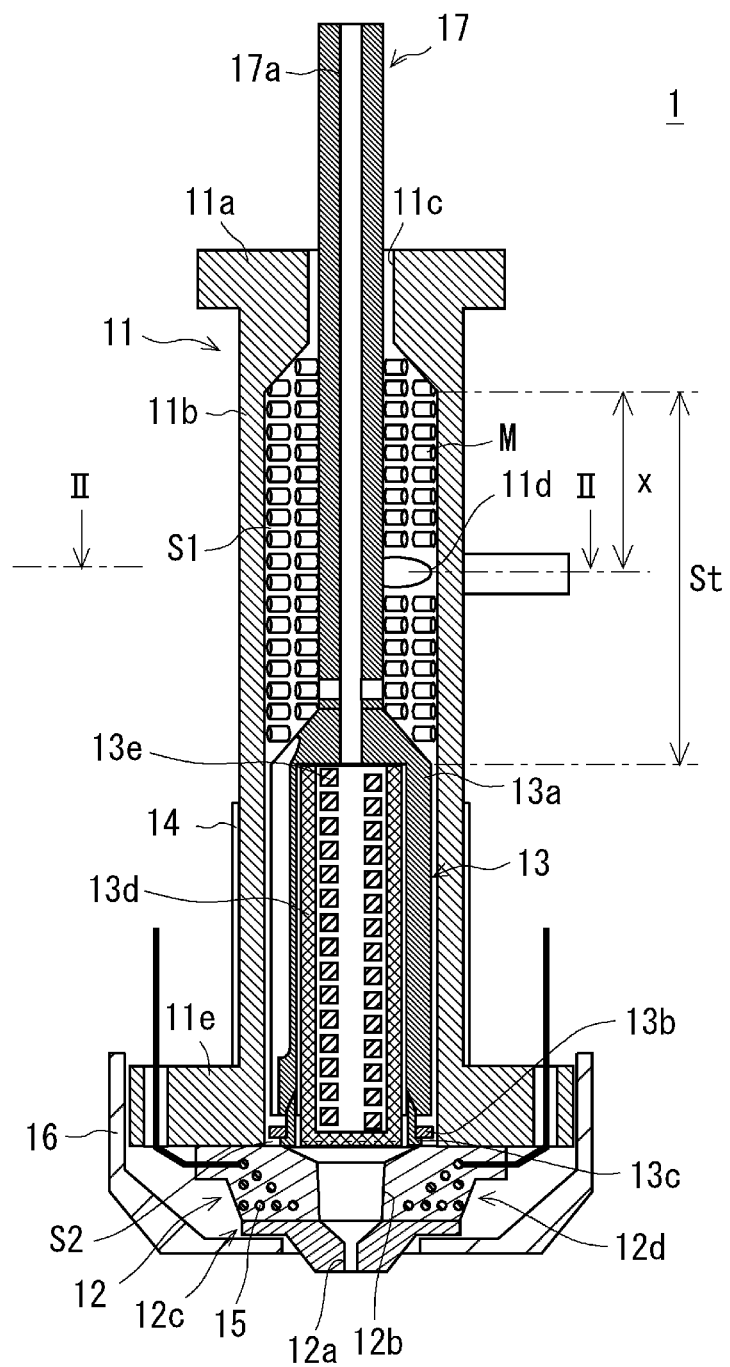
FIG. 1 is a cross-sectional view schematically showing an injection molding machine according to a first embodiment.
Figure 2:
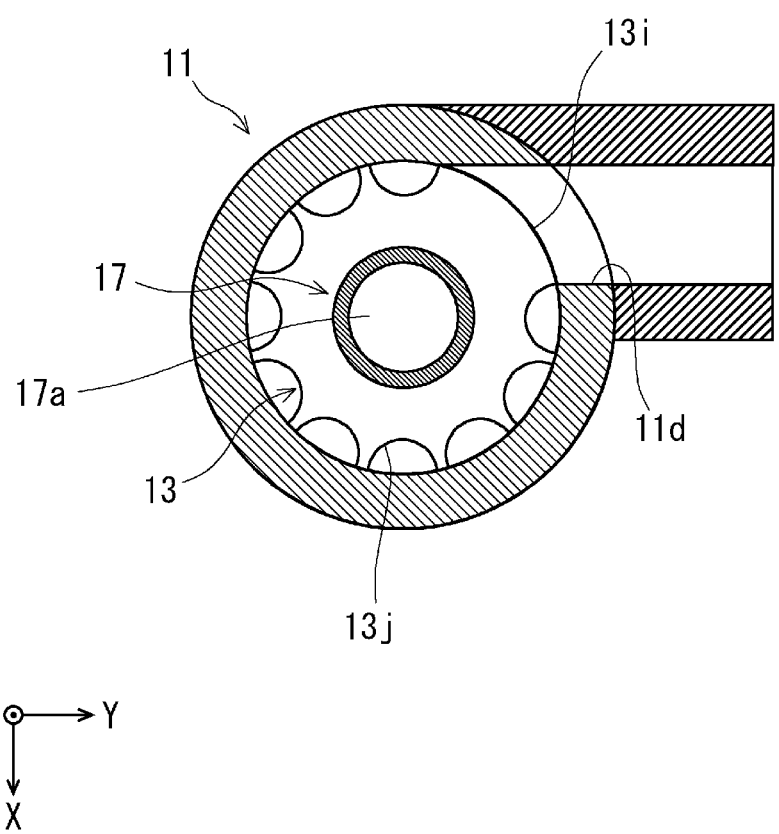
FIG. 2 is a cross-sectional view taken along the line II-II of FIG. 1.

FIG. 1 is a sectional view schematically showing an injection molding machine according to this embodiment, and shows a state in which a resin material has been supplied to the inside of a cylinder. FIG. 2 is a cross-sectional view taken along the line II-II of FIG. 1. The following description will be given using a three-dimensional (XYZ) coordinate system for the sake of clarity of the description. In FIG. 1 and the like, the resin material supplied to the inside of the cylinder is shown in a simplified manner.

As shown in FIG. 1, an injection molding machine 1 includes a cylinder 11, an injection part 12, a piston 13, a first heating part 14, and a second heating part 15. The cylinder 11 is extended in the Z-axis direction and has, as its basic form, a topped cylindrical shape in which the end part of the cylinder 11 on the Z-axis positive side is blocked.

That is, the cylinder 11 includes a blocking part 11a arranged on the Z-axis positive side thereof and a cylindrical side wall part 11b that is continuous with the peripheral part of the blocking part 11a and is extended in the Z-axis negative side from the blocking part 11a, and the end part of the cylinder 11 on the Z-axis negative side is opened. At this time, the surface of the blocking part 11a of the cylinder 11 on the Z-axis negative side is preferably an inclined surface that is inclined toward the Z-axis negative side from the center of the cylinder 11 toward the peripheral part thereof.

A through-hole 11c that penetrates through the blocking part 11a in the Z-axis direction is formed in the blocking part 11a of the cylinder 11. A supply hole 11d is formed in the side wall part 11b of the cylinder 11, and a hopper in which a resin material M is accommodated is connected to the supply hole 11d.

The placement of the supply hole 11d will be described later. A flange part 11e protruding toward the outer side of the cylinder 11 in the radial direction is formed in the end part of the side wall part 11b of the cylinder 11 on the Z-axis negative side.

The injection part 12 is arranged on the Z-axis negative side with respect to the cylinder 11 in such a way that the injection part 12 is able to inject the molten resin extruded from the cylinder 11. The injection part 12 includes an outlet 12a that injects the molten resin and a communication path 12b that guides the molten resin to the outlet 12a.

The above-described injection part 12 is fixed to the flange part 11e of the cylinder 11 through retaining nuts 16. At this time, as shown in FIG. 1, an end part of the communication path 12b on the Z-axis positive side is communicated with the inside of the cylinder 11.

Note that the injection part 12 is divided into a first plate 12c where the outlet 12a is formed and a second plate 12d where the communication path 12*b* is formed, and the second plate 12*d* may be formed of a material excellent in thermal conductivity such as a ceramic plate, the detailed functions of which plates will be described later.

Figure 3:
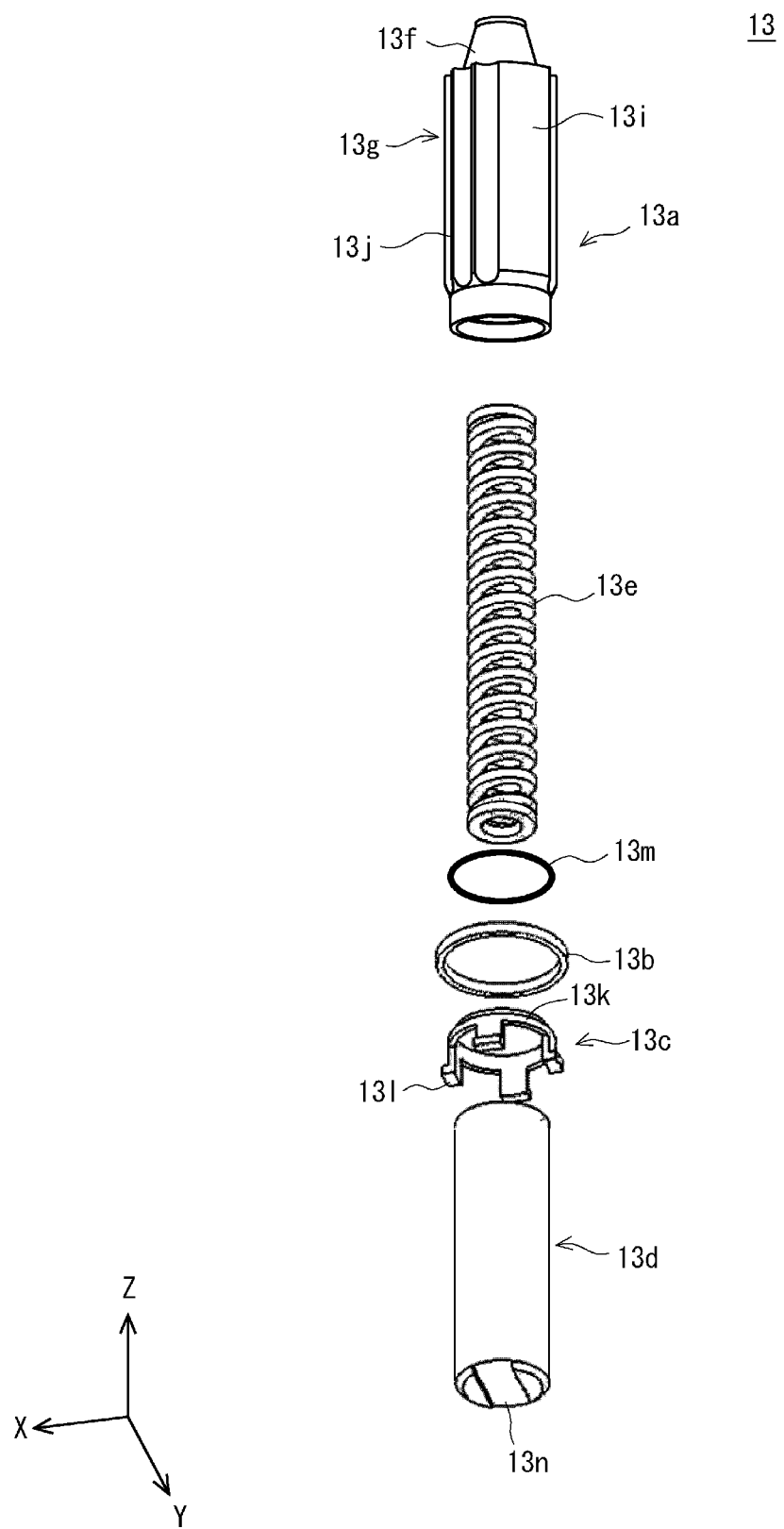
FIG. 3 is an exploded view showing a piston in the injection molding machine according to the first embodiment.
Figure 4:
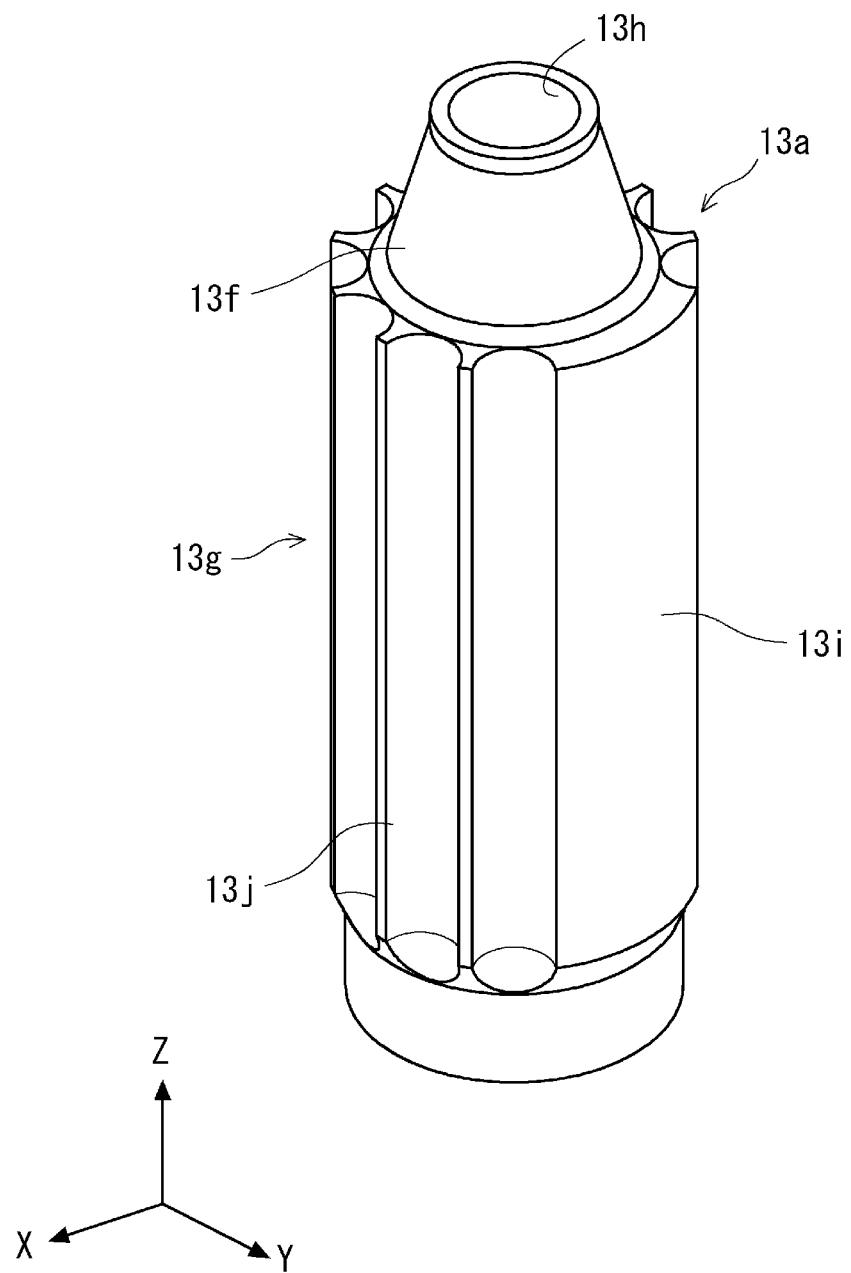
FIG. 4 is a perspective view showing a torpedo piston in the injection molding machine according to the first embodiment.
Figure 5:
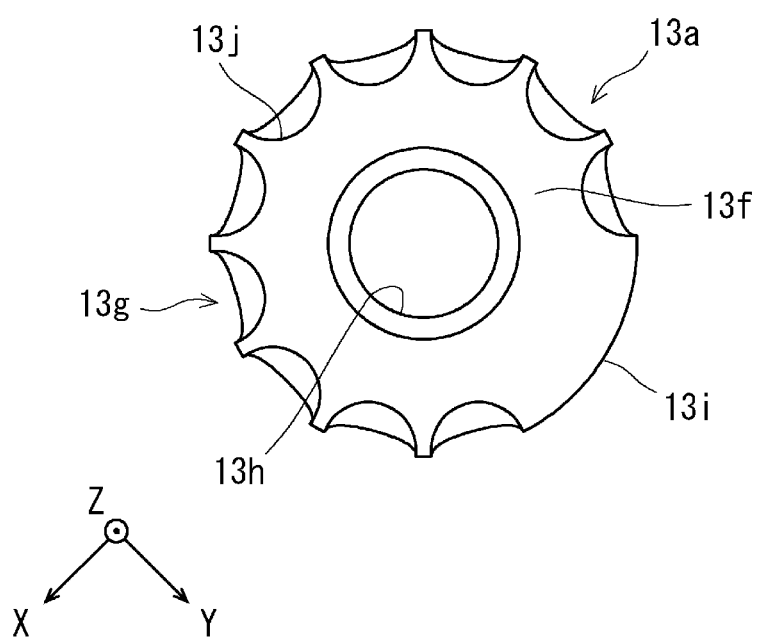
FIG. 5 is a diagram showing the torpedo piston in the injection molding machine according to the first embodiment as viewed from the Z-axis positive side.

The piston 13 is disposed inside the cylinder 11 so as to be movable inside the cylinder 11. FIG. 3 is an exploded view showing the piston in the injection molding machine according to this embodiment. FIG. 4 is a perspective view showing a torpedo piston in the injection molding machine according to this embodiment. FIG. 5 is a diagram showing the torpedo piston in the injection molding machine according to this embodiment as viewed from the Z-axis positive side thereof.

As shown in FIG. 3, the piston 13 includes a torpedo piston 13*a*, a non-return ring 13*b*, a stopper 13*c*, a pressurizing piston 13*d*, and an energizing member 13*e*. The torpedo piston 13*a*, which has, as its basic form, a topped cylindrical shape in which the end part of the torpedo piston 13*a* on the Z-axis positive side is blocked, roughly has an outer circumferential shape substantially equal to the inner circumferential shape of the cylinder 11.

That is, the torpedo piston 13*a* includes a blocking part 13*f* arranged on the Z-axis positive side thereof and a cylindrical side wall part 13*g* that is continuous with the peripheral part of the blocking part 13*f* and is extended in the Z-axis negative side from the blocking part 13*f*, and the end part of the torpedo piston 13*a* on the Z-axis negative side is opened.

As shown in FIG. 4, a through-hole 13*h* that penetrates through the blocking part 13*f* in the Z-axis direction is formed in the blocking part 13*f* of the torpedo piston 13*a*. At this time, the surface of the blocking part 13*f* on the Z-axis positive side is preferably an inclined surface that is inclined toward the Z-axis negative side from the center of the torpedo piston 13*a* toward the peripheral part thereof so that it corresponds to the shape of the surface of the blocking part 11*a* of the cylinder 11 on the Z-axis negative side.

As shown in FIGS. 3 to 5, a closing part 13*i* and groove parts 13*j* are formed in the side wall part 13*g* of the torpedo piston 13*a*. The closing part 13*i* closes the supply hole 11*d* of the cylinder 11 in the period during which the piston 13 is disposed inside the cylinder 11 within a predetermined range in the Z-axis direction.

As shown in FIG. 2, the closing part 13*i* is disposed in a region corresponding to the supply hole 11*d* of the cylinder 11 in the side wall part 13*g* of the torpedo piston 13*a* when viewed from the Z-axis direction. Further, the outer circumferential shape (i.e., side) of the closing part 13*i* corresponds to the inner circumferential shape (i.e., side) of the cylinder 11. The above-described closing part 13*i* is extended in the Z-axis direction, and may be disposed, for example, in substantially the entire area of the side wall part 13*g* of the torpedo piston 13*a* in the Z-axis direction.

The groove parts 13*j*, which are extended in the Z-axis direction, are arranged at approximately equal intervals in the circumferential direction of the torpedo piston 13*a* in a region of the side wall part 13*g* of the torpedo piston 13*a* other than the region of the side wall part 13*g* in which the closing part 13*i* is formed.

As will be described later, the groove parts 13*j* may have such a shape and an arrangement that it is possible to plasticize, when the resin material M supplied to a first space S1 (see FIG. 1) in the cylinder 11 on the Z-axis positive side with respect to the piston 13 passes through the groove parts 13*j*, the resin material M to obtain a molten resin, thereby allowing the molten resin to flow into a second space S2 in the cylinder 11 on the Z-axis negative side with respect to the piston 13.

As shown in FIG. 3, the non-return ring 13*b* has a ring shape having an outer circumferential shape that is substantially equal to the inner circumferential shape of the cylinder 11. Further, a radial width dimension of the non-return ring 13*b* has a length equal to or greater than the depth of the groove part 13*j*. The above-described non-return ring 13*b* is arranged on the Z-axis negative side with respect to the torpedo piston 13*a*.

The stopper 13*c* holds the non-return ring 13*b* in the end part of the torpedo piston 13*a* on the Z-axis negative side. Specifically, as shown in FIG. 3, for example, the stopper 13*c* includes a ring part 13*k* and hook parts 13*l*.

The ring part 13*k* has an outer circumferential shape that is substantially equal to the inner circumferential shape of the torpedo piston 13*a*. Each of the hook parts 13*l* has a substantially L shape when it is seen from the direction perpendicular to the Z axis, and the end part of the vertical part of the hook part 13*l* on the Z-axis positive side is fixed to the ring part 13*k*.

As shown in FIG. 3, the horizontal part of the hook part 13*l* protrudes toward the outside of the ring part 13*k* from the end part of the vertical part of the hook part 13*l* on the Z-axis negative side. The hook parts 13*l* are arranged at approximately equal intervals in the circumferential direction of the ring part 13*k*.

In a state in which the ring part 13*k* and the vertical parts of the hook parts 13*l* are made to pass through the through-hole of the non-return ring 13*b*, the ring part 13*k* is fit into the open port of the end part of the torpedo piston 13*a* on the Z-axis negative side. Accordingly, the non-return ring 13*b* is held in the end part of the torpedo piston 13*a* on the Z-axis negative side via the stopper 13*c*.

Note that the length of the vertical parts of the hook parts 13*l* in the Z-axis direction is larger than the thickness of the non-return ring 13*b* in the Z-axis direction. Accordingly, the non-return ring 13*b* is movable in the Z-axis direction between the end part of the cylinder 11 on the Z-axis negative side and the horizontal part of the hook parts 13*l*. It is sufficient, however, that the stopper 13*c* have a structure capable of holding the non-return ring 13*b* in the end part of the cylinder 11 on the Z-axis negative side in such a way that the non-return ring 13*b* is movable in the Z-axis direction.

As shown in FIG. 3, the pressurizing piston 13*d* has a bottomed cylindrical shape in which the end part of the pressurizing piston 13*d* on the Z-axis negative side is blocked, and the end surface of the pressurizing piston 13*d* on the Z-axis negative side is, for example, a substantially flat surface that is parallel to the XY plane. The outer circumferential shape of the pressurizing piston 13*d* is substantially equal to the inner circumferential shape of the torpedo piston 13*a*.

The pressurizing piston 13*d* is inserted into the torpedo piston 13*a* so that the pressurizing piston 13*d* can be moved therein in a state in which a space between the torpedo piston 13*a* and the pressurizing piston 13*d* is blocked by a seal member 13*m*. Therefore, the pressurizing piston 13*d* is moved in the Z-axis direction with respect to the torpedo piston 13*a*, whereby an amount of protrusion into the second space S2 of the cylinder 11 with respect to the torpedo piston 13*a* is changed.

As shown in FIG. 3, an enter part 13*n* which the molten resin enters may be formed on the end surface of the pressurizing piston 13*d* on the Z-axis negative side, the detailed functions of which will be described later. The enter part 13n, which is, for example, a groove part formed on the end surface of the pressurizing piston 13d on the Z-axis negative side, is extended in the direction that is perpendicular to the Z axis.

Note that it is sufficient that the enter part 13n have such a shape that it allows the molten resin to enter the space between the end surface of the pressurizing piston 13d on the Z-axis negative side and the end part of the injection part 12 on the Z-axis positive side in a state in which the end surface of the pressurizing piston 13d on the Z-axis negative side is in contact with the end part of the injection part 12 on the Z-axis positive side.

The energizing member 13e energizes the pressurizing piston 13d toward the second space S2 of the cylinder 11 with respect to the torpedo piston 13a. As shown in FIG. 3, the energizing member 13e is, for example, an elastic member such as a coil spring.

The energizing member 13e is disposed inside the pressurizing piston 13d, and the end part of the energizing member 13e on the Z-axis positive side is in contact with the end part of the torpedo piston 13a on the Z-axis positive side and the end part of the energizing member 13e on the Z-axis negative side is in contact with the end part of the pressurizing piston 13d on the Z-axis negative side.

As shown in FIG. 1, an end part of a rod 17 on the Z-axis negative side is connected to the end part of the above-described piston 13 on the Z-axis positive side. A through-hole 17a that penetrates through the rod 17 in the Z-axis direction is formed in the rod 17, and the through-hole 13h of the torpedo piston 13a communicates with the through-hole 17a of the rod 17.

The rod 17 is a component of a drive apparatus for driving the piston 13, and is made to pass through the through-hole 11c of the cylinder 11. Further, for example, the rod 17 is connected to a slider of a ball screw, which is a component of the drive apparatus, and is moved in the Z-axis direction via the slider by rotationally driving a screw shaft of the ball screw with a motor. However, a means for moving the rod 17 in the Z-axis direction is not limited to the above one.

The first heating part 14 includes, for example, a heat heater, and is wound around a part of the side wall part 11b of the cylinder 11 on the Z-axis negative side. However, the first heating part 14 may have any structure that can heat the resin material inside the cylinder 11 and maintain the temperature of the molten resin.

The second heating part 15 includes, for example, a heater wire, and is provided in the second plate 12d of the injection part 12. However, the second heating part 15 may have any heating element that can heat the molten resin injected from the injection part 12 to a temperature within a predetermined range.

Next, the position of the supply hole 11d of the cylinder 11 in the Z-axis direction in the injection molding machine 1 according to this embodiment will be described. The supply hole 11d of the cylinder 11 may be disposed at a position where the softened resin (e.g., the elastic or the semi-molten resin) and the molten resin can be closed by the closing part 13i of the piston 13 so that they do not flow back from the supply hole 11d of the cylinder 11 at least when the resin material M is plasticized in the first space S1 of the cylinder 11.

For example, the supply hole 11d of the cylinder 11 may be disposed in the cylinder 11 at a position in the Z-axis direction that satisfies the following Expression (1).

$$(St-x)/St \leq \gamma \qquad \text{<Expression 1>}$$

where St is a stroke amount of the torpedo piston 13a from the position where the torpedo piston 13a is disposed on the most Z-axis negative side (i.e., the bottom dead center) to the position where the torpedo piston 13a is disposed on the most Z-axis positive side (i.e., the top dead center), γ is a preset filling rate of the resin material M, and x is a distance from the end part of the blocking part 11a of the cylinder 11 on the Z-axis negative side to the position at the center of the supply hole 11d.

At this time, the filling rate γ can be set, for example, based on the volume of the first space S1 of the cylinder 11 in a state in which the piston 13 is disposed on the most Z-axis negative side and the volume of the resin material M supplied to the first space S1 of the cylinder 11 in this state.

For example, in a case in which polypropylene, polyamide, or the like is used as the resin material M and the filling rate γ is set to 0.5 (i.e., 50%), when the position of the piston 13 in the Z-axis direction reaches a position in the piston 13 which indicates the half of the stroke amount St, the resin material M starts to be softened due to compression by the piston 13 and the heating of the first heating part 14. As a result, the supply hole 11d is disposed at a position in the piston 13 which indicates less than half of the stroke amount toward the Z-axis positive side.

By the above, the supply hole 11d can be closed by the closing part 13i of the torpedo piston 13a before the piston 13 moves to the Z-axis positive side and the filling rate of the resin material M becomes 1 (i.e., 100%). Therefore, it is possible to prevent the softened resin from flowing back from the supply hole 11d of the cylinder 11.

Figure 6:
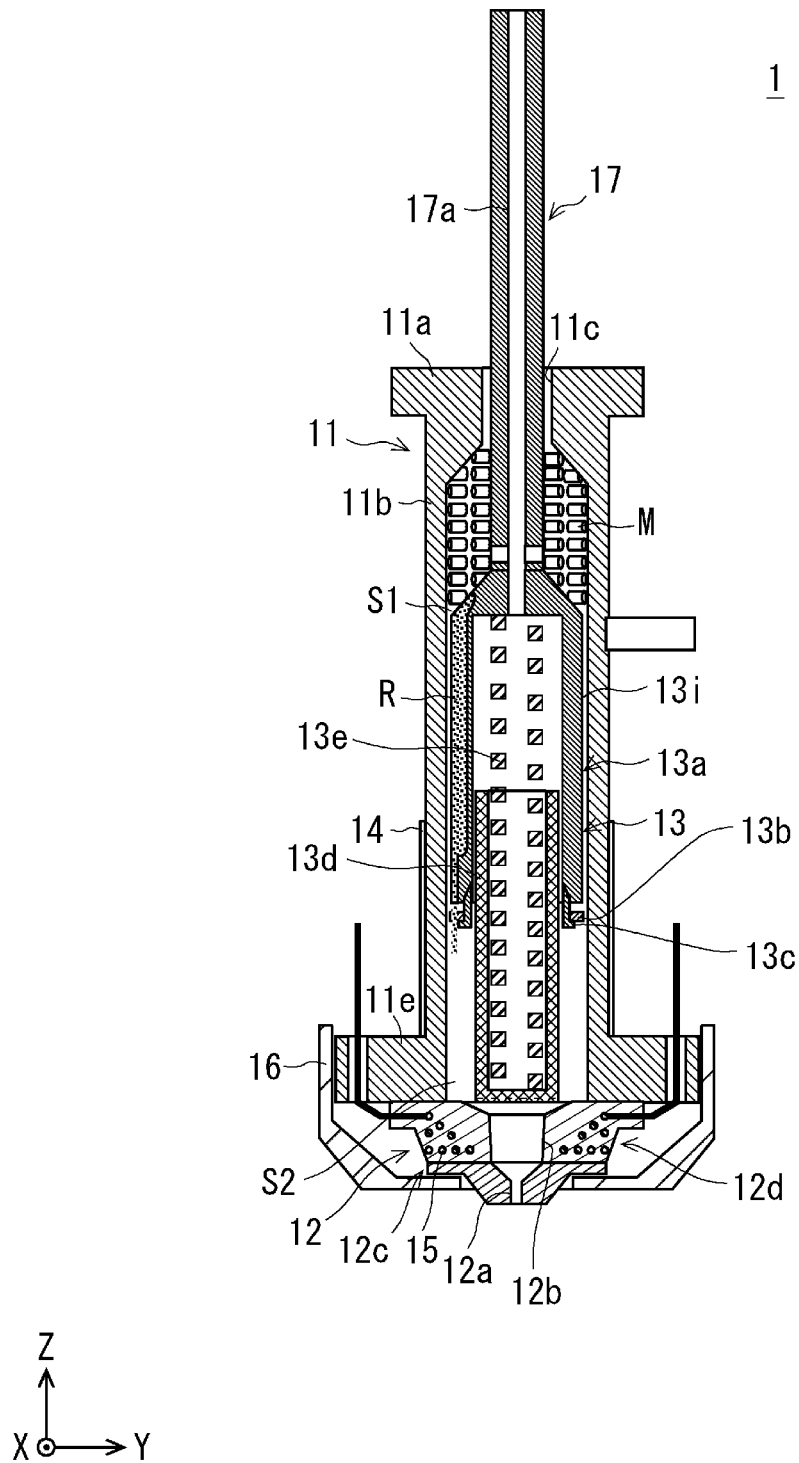
FIG. 6 is a cross-sectional view showing an operation for plasticizing a resin material in the injection molding machine according to the first embodiment.
Figure 7:
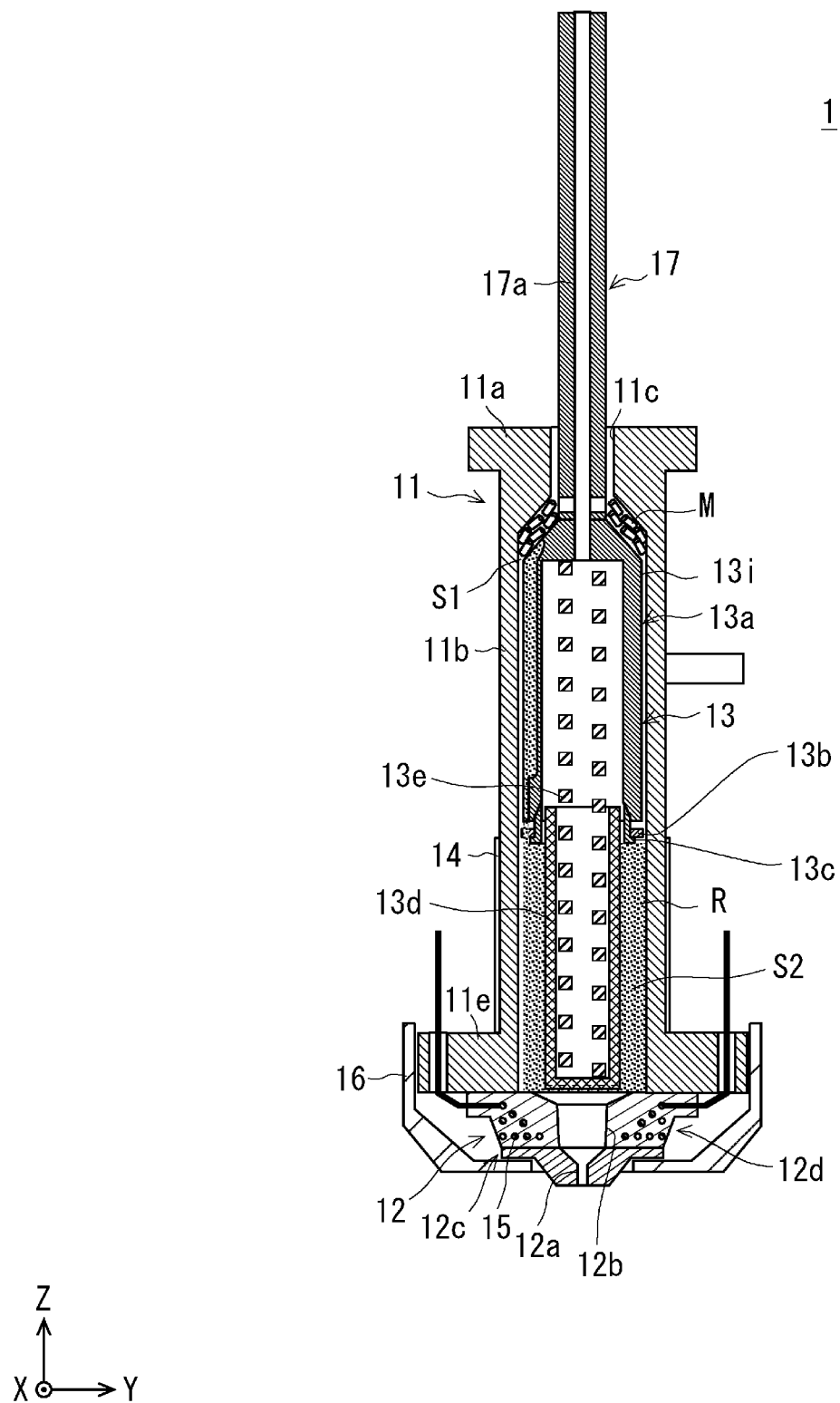
FIG. 7 is a cross-sectional view showing the operation for plasticizing a resin material in the injection molding machine according to the first embodiment.

Next, a flow in which a workpiece is molded using the injection molding machine 1 according to this embodiment will be described. Each of FIGS. 6 and 7 is a cross-sectional view showing an operation for plasticizing a resin material in the injection molding machine according to this embodiment. First, the pelletized resin material M is supplied from the supply hole 11d of the cylinder 11 to the first space S1 of the cylinder 11 while the piston 13 is being moved to the Z-axis negative side via the rod 17 from the place in which the piston 13 is disposed on the most Z-axis positive side.

As shown in FIG. 1, when the piston 13 reaches the most Z-axis negative side, the supply of the resin material M is stopped. At this time, the resin material M is supplied to the first space S1 of the cylinder 11 at the above-described filling rate γ. Further, the pressurizing piston 13d of the piston 13 is pushed into the inside of the torpedo piston 13a in contact with the injection part 12, and accordingly, the energizing member 13e is compressed.

Next, the piston 13 is made to move to the Z-axis positive side via the rod 17. At this time, when the filling rate of the resin material M in the first space S1 has reached 100%, the resin material M is compressed by the piston 13, the blocking part 11a of the cylinder 11, and the side wall part 11b of the cylinder 11, and is heated by the first heating part 14, whereby the resin material M is softened.

Further, when the filling rate of the resin material M in the first space S1 has reached 100%, as shown in FIG. 6, the closing part 13i of the piston 13 reaches the supply hole 11d of the cylinder 11 so as to close the supply hole 11d. By the above, it is possible to prevent the softened resin from flowing back from the supply hole 11d.

When the filling rate of the resin material M in the first space S1 has reached 100%, the piston 13 further moves to the Z axis positive side, and thus the resin material M is plasticized while passing through the groove parts 13j of the piston 13 to become a molten resin, and flows into the second space S2 of the cylinder 11.

At this time, the non-return ring 13b of the piston 13 is pushed toward the Z-axis negative side, and the molten resin can be properly flown into the second space S2 of the cylinder 11 from the through-hole of the non-return ring 13b via the gap between the end part of the torpedo piston 13a on the Z-axis negative side and the non-return ring 13b.

Further, when the surface of the torpedo piston 13a of the piston 13 on the Z-axis positive side is formed on the inclined surface that is inclined toward the Z-axis negative side from the center of the torpedo piston 13a toward the peripheral part thereof, the resin material M can be properly guided to the groove parts 13j of the torpedo piston 13a of the piston 13 when the piston 13 moves toward the Z-axis positive side.

Note that, as the piston 13 moves to the Z-axis positive side, the pressurizing piston 13d protrudes from the torpedo piston 13a by the energizing force of the energizing member 13e. At this time, the shape of the pressurizing piston 13d, the energizing force of the energizing member 13e, and the like may be set so that the amount of decrease in the volume of the first space S1 of the cylinder 11 becomes equal to or greater than the amount of increase in the volume of the second space S2 as the piston 13 moves to the Z-axis positive side. By doing so, it is possible to prevent gas from flowing into the second space S2 of the cylinder 11 when the piston 13 moves to the Z-axis positive side.

Next, as shown in FIG. 7, when the piston 13 reaches the most Z-axis positive side, the piston 13 is made to move to the Z-axis negative side via the rod 17. Thus, a molten resin R is pushed by the piston 13, and the molten resin R is then injected through the communication path 12b and the outlet 12a of the injection part 12.

Note that, as the piston 13 moves to the Z-axis negative side, the pressure in the second space S2 of the cylinder 11 increases, next the molten resin R enters the enter part 13n of the pressurizing piston 13d, and then the pressurizing piston 13d moves to the Z-axis positive side and is pushed to the inside of the torpedo piston 13a.

At this time, the gas present inside the torpedo piston 13a can be exhausted to the outside of the injection molding machine 1 through the through-hole 13h of the torpedo piston 13a and the through-hole 17a of the rod 17, and thus the pressurizing piston 13d can be smoothly moved.

Further, when the piston 13 moves to the Z-axis negative side, the non-return ring 13b of the piston 13 is pushed toward the Z-axis positive side and the groove parts 13j of the torpedo piston 13a are blocked by the non-return ring 13b, whereby it is possible to prevent the molten resin R from flowing back into the first space S1 of the cylinder 11 via the groove parts 13j of the torpedo piston 13a.

In addition, when the piston 13 moves to the Z-axis negative side, the closing part 13i is disposed between the supply hole 11d of the cylinder 11 and the second space S2 in the Z-axis direction. Thus, it is possible to further prevent the molten resin R from flowing back into the first space S1 of the cylinder 11.

Further, when the second plate 12d is formed of a material excellent in thermal conductivity such as a ceramic plate as described above, the heat in the second heating part 15 can be efficiently transmitted to the molten resin. In addition, the second heating part 15 can be easily replaced, because the second plate 12d can be replaced by a new one by loosening the retaining nuts 16 when the second heating part 15 is damaged.

It is possible to additively manufacture a desired workpiece by, for example, moving the injection molding machine 1 or moving a table disposed on the Z-axis negative side with respect to the injection molding machine 1 while repeating the above-described plasticization of the resin material M and injection of the molten resin R.

As described above, in the injection molding machine 1 and the injection molding method according to this embodiment, the closing part 13i that, when the torpedo piston 13a moves to the Z-axis positive side in order to plasticize the resin material M, moves together with the torpedo piston 13a and closes the supply hole 11d of the cylinder 11. Therefore, it is possible to prevent the softened resin from flowing back from the supply hole 11d of the cylinder 11, and thus it is possible to properly supply the resin material M to the first space S1 of the cylinder 11.

At this time, since the closing part 13i moves together with the torpedo piston 13a, the position of the supply hole 11d of the cylinder 11 can be changed as appropriate so that the supply hole 11d of the cylinder 11 is closed by the closing part 13i when the resin material M is softened.

For example, by setting the position of the supply hole 11d as described above, the supply hole 11d can be closed by the closing part 13i in a state in which the piston 13 has moved to the Z-axis positive side and the filling rate of the resin material M has become 100%. Therefore, when a material of which a glass transition point is low is used as the resin material M, it is possible to prevent the softened resin, which is obtained by the resin material M being heated by the first heating part 14, from flowing back from the supply hole 11d of the cylinder 11.

Further, in this embodiment, since the closing part 13i is formed in the side wall part 13g of the torpedo piston 13a, the closing part 13i can be disposed between the supply hole 11d of the cylinder 11 and the second space S2 in the Z-axis direction when the molten resin R in the second space S2 is extruded by the cylinder 11. Therefore, it is possible to prevent the molten resin R from flowing back into the first space S1 of the cylinder 11, and as a result, it is possible to prevent the molten resin R from flowing back from the supply hole 11d of the cylinder 11.

Second Embodiment

Figure 8:
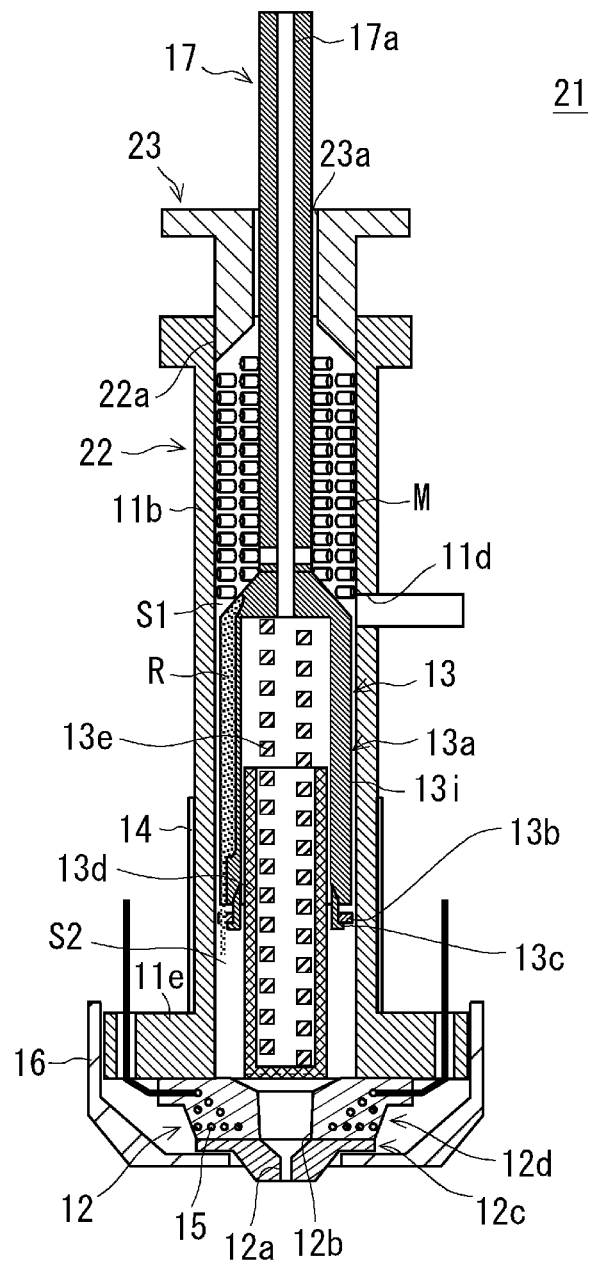
FIG. 8 is a cross-sectional view schematically showing an injection molding machine according to a second embodiment.
Figure 8:
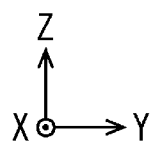

FIG. 8 is a cross-sectional view schematically showing an injection molding machine according to this embodiment. An injection molding machine 21 according to this embodiment has a structure substantially the same as that of the injection molding machine 1 according to the first embodiment, and thus redundant descriptions thereof are omitted and the same members are described using the same reference symbols.

As shown in FIG. 8, the injection molding machine 21 according to this embodiment has a structure in which an end part of a cylinder 22 on the Z-axis positive side is open, and a plunger 23 pushes the resin material M supplied to the first space S1 to the Z-axis negative side via an open port 22a of the cylinder 22, whereby the piston 13 and the plunger 23 can compress the resin material M.

The plunger 23 has a pillar shape as its basic form. Further, a through-hole 23a that penetrates in the Z-axis direction is formed in the center of the plunger 23, and the rod 17 is made to pass through the through-hole 23a. At this time, the surface of the plunger 23 on the Z-axis negative side may be inclined so that it corresponds to the shape of the end part of the torpedo piston 13a on the Z-axis positive side.

The above-described injection molding machine 21 can compress the resin material M not only by the piston 13 but also by the piston 13 and the plunger 23 together. Therefore, even when a material of which the filling rate is low in the first space S1 of the cylinder 22 is used as the resin material M, the resin material M can be properly plasticized.

Third Embodiment

Figure 9:
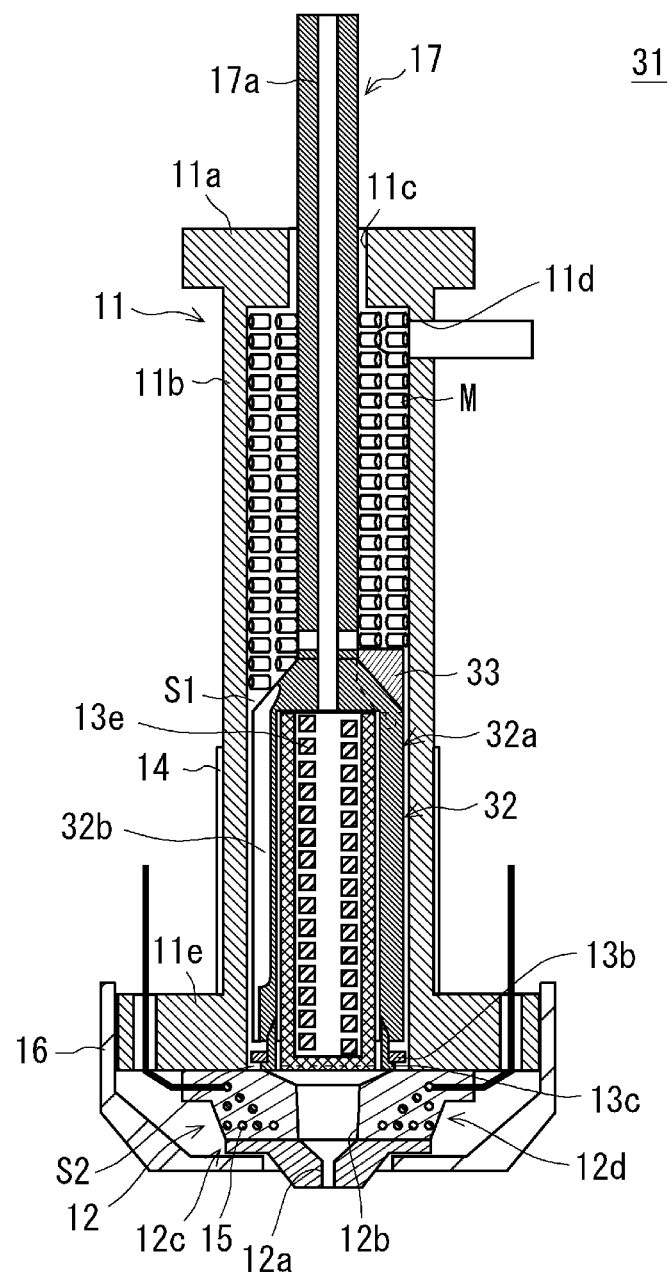
FIG. 9 is a cross-sectional view schematically showing an injection molding machine according to a third embodiment.
Figure 10:
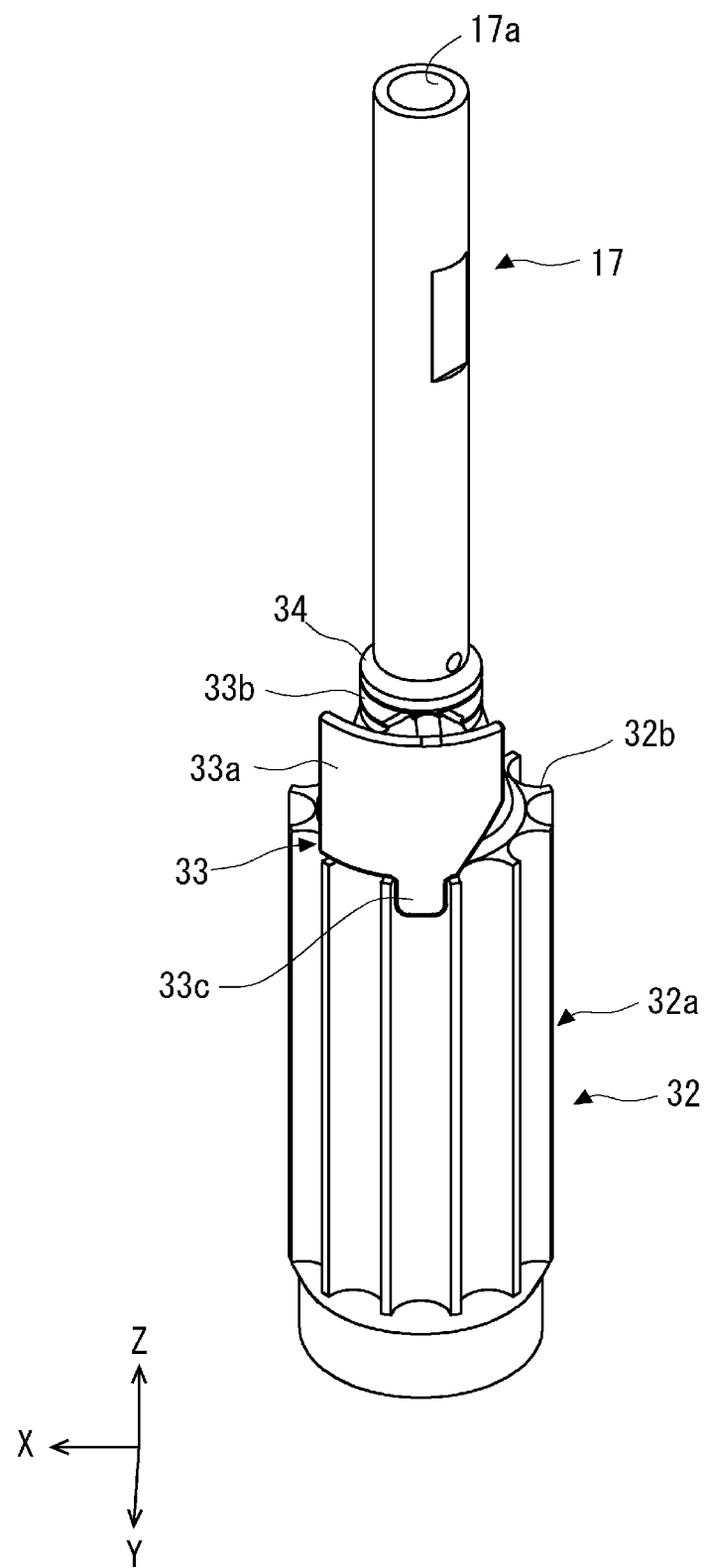
FIG. 10 is a perspective view showing a rod, a piston, and a closing part in the injection molding machine according to the third embodiment.
Figure 11:
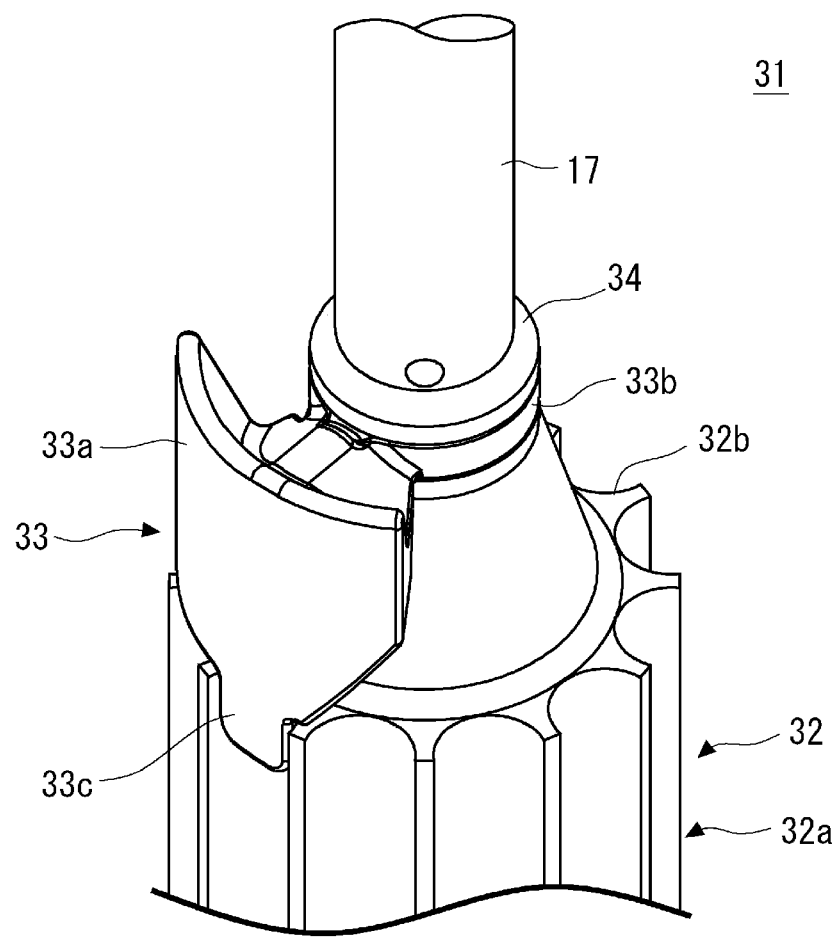
FIG. 11 is an enlarged perspective view showing the periphery of the closing part in the injection molding machine according to the third embodiment.
Figure 11:
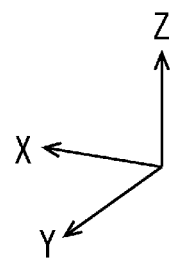
Figure 12:
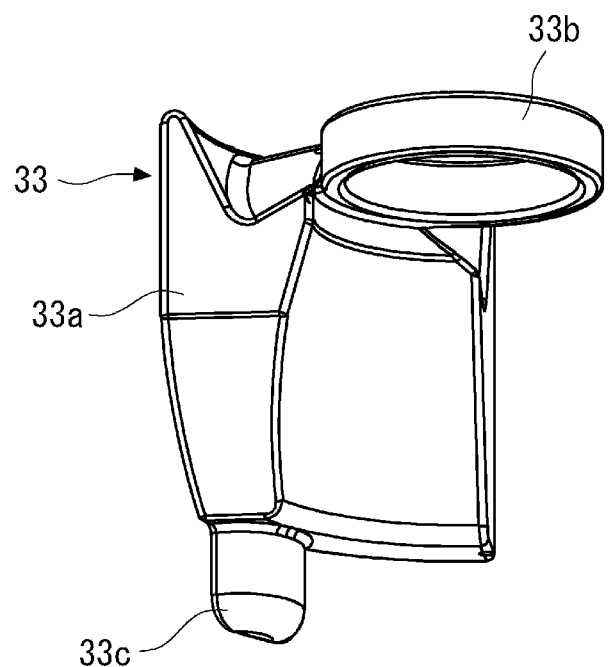
FIG. 12 is a perspective view showing the closing part in the injection molding machine according to the third embodiment.
Figure 12:
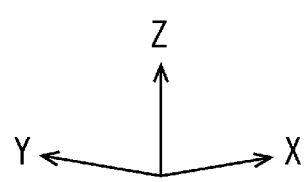

FIG. 9 is a cross-sectional view schematically showing an injection molding machine according to this embodiment, and shows a state in which a resin material has been supplied to the inside of a cylinder. FIG. 10 is a perspective view showing a rod, a piston, and a closing part in the injection molding machine according to this embodiment. FIG. 11 is an enlarged perspective view showing the periphery of the closing part in the injection molding machine according to this embodiment. FIG. 12 is a perspective view showing the closing part in the injection molding machine according to this embodiment.

An injection molding machine 31 according to this embodiment has a structure substantially the same as that of the injection molding machine 1 according to the first embodiment, and thus redundant descriptions thereof are omitted and the same members are described using the same reference symbols. The injection molding machine 31 according to this embodiment is suitably used to additively manufacture a workpiece using a resin material of which the glass transition point is lower than that of polypropylene, polyamide, or the like, such as ABS and polycarbonate.

Therefore, the resin material M supplied to the first space S1 of the cylinder 11 is hardly softened, for example, by heating performed by the first heating part 14, and is generally softened only by shearing when it passes through a groove part 32b of a torpedo piston 32a in a piston 32. Thus, the supply hole 11d is formed near the end part of the side wall part 11b of the cylinder 11 on the Z-axis positive side so that the resin material M is properly supplied to the first space S1.

Further, the piston 32 according to this embodiment has a structure substantially the same as that of the piston 13 according to the first embodiment, except that the groove part 32b is formed in the entire circumference of the side wall part of the torpedo piston 32a. Therefore, a closing part 33 is disposed on the Z-axis positive side with respect to the piston 32 so that the groove part 32b of the torpedo piston 32a does not reach the supply hole 11d of the cylinder 11 and the supply hole 11d can be closed by the closing part 33.

As shown in FIGS. 9 to 11, the closing part 33 is formed of a member that is different from that of the piston 32. As shown in FIG. 12, the closing part 33 includes a closing wall 33a, a ring part 33b, and an engaging piece 33c. The closing wall 33a has, as its basic form, a plate body having a thickness and is extended in the Z-axis direction. Further, the outer circumferential shape (i.e., side) of the closing wall 33a corresponds to the inner circumferential shape (i.e., side) of the cylinder 11.

The height of the closing wall 33a in the Z-axis direction is longer than the height of the supply hole 11d of the cylinder 11 in the Z-axis direction. That is, the outer circumferential surface of the closing wall 33a has a shape which can cover the entire area of the supply hole 11d along the inner circumferential surface of the cylinder 11.

The surface of the closing wall 33a on the Z-axis negative side may be inclined so that it corresponds to the shape of the end part of the torpedo piston 32a on the Z-axis positive side. At this time, the end part of the closing wall 33a on the Z-axis positive side may have an inclined surface that is inclined in the Z-axis negative side direction toward the clockwise or counterclockwise side in the circumferential direction of the piston 32.

The ring part 33b is fixed to the end part of the closing wall 33a on the Y-axis negative side. The ring part 33b includes a penetration part that penetrates in the Z-axis direction, and the inner circumferential shape (i.e., inner circumference) of the penetration part is slightly larger than the outer circumferential shape (i.e., outer circumference) of the rod 17. The engaging piece 33c protrudes from the closing wall 33a toward the Z-axis negative side, and has a shape allowing it to be engaged with the groove parts 32b of the torpedo piston 32a.

When the above-described closing part 33 is fixed to the piston 32, the ring part 33b is passed through the rod 17, the closing wall 33a is placed on the torpedo piston 32a, and the engaging piece 33c is engaged with the groove part 32b of the torpedo piston 32a.

Further, for example, when a male screw is formed in a part of the rod 17 on the Z-axis negative side, a nut 34, which is passed through the rod 17, is screwed into the male screw of the rod 17, and the ring part 33b is sandwiched between the nut 34 and the torpedo piston 32a, whereby the closing part 33 can be fixed to the piston 32. However, any fixing means that can fix the closing part 33 to the piston 32 on the Z-axis positive side can be used.

Figure 13:
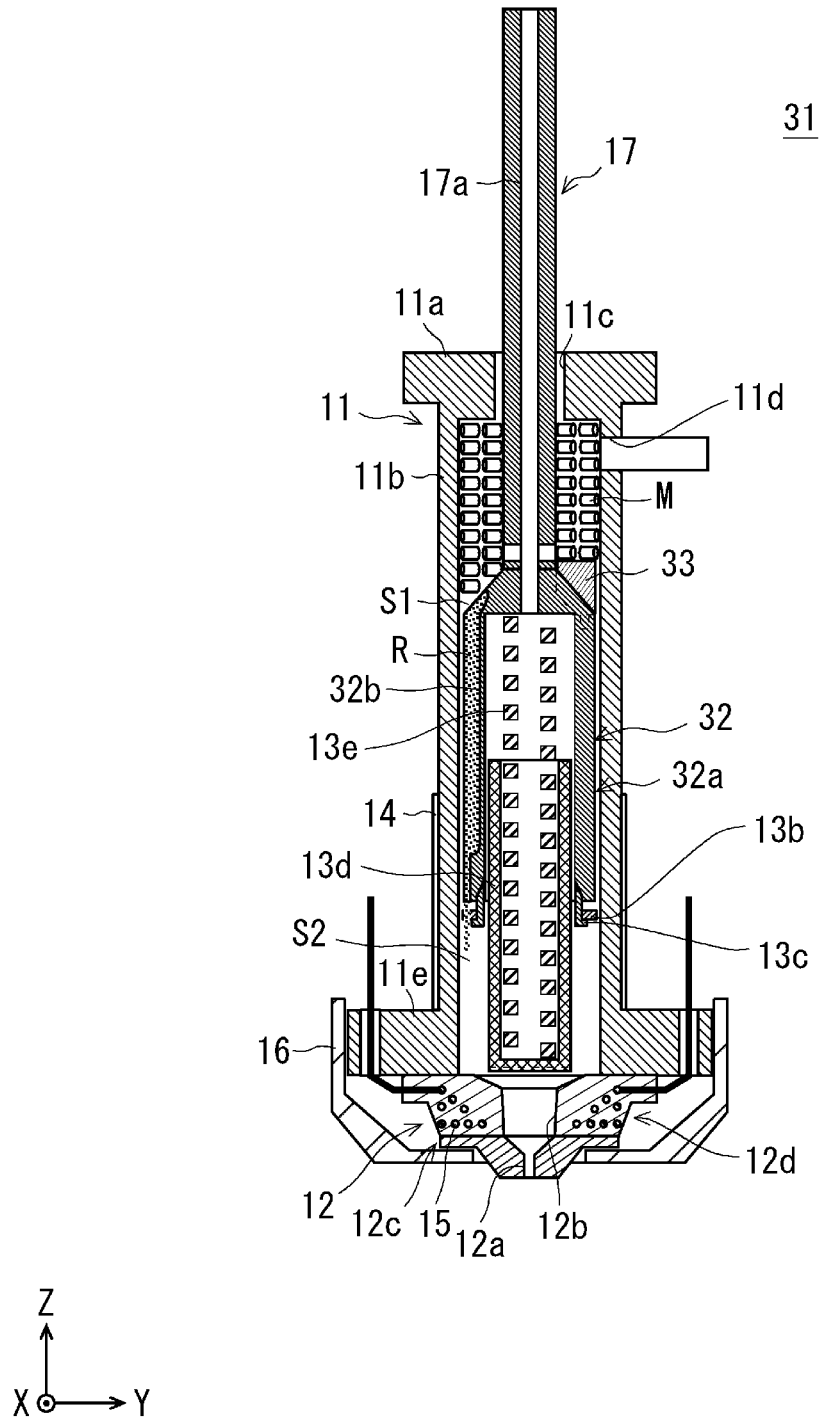
FIG. 13 is a cross-sectional view showing an operation for plasticizing a resin material in the injection molding machine according to the third embodiment.
Figure 14:
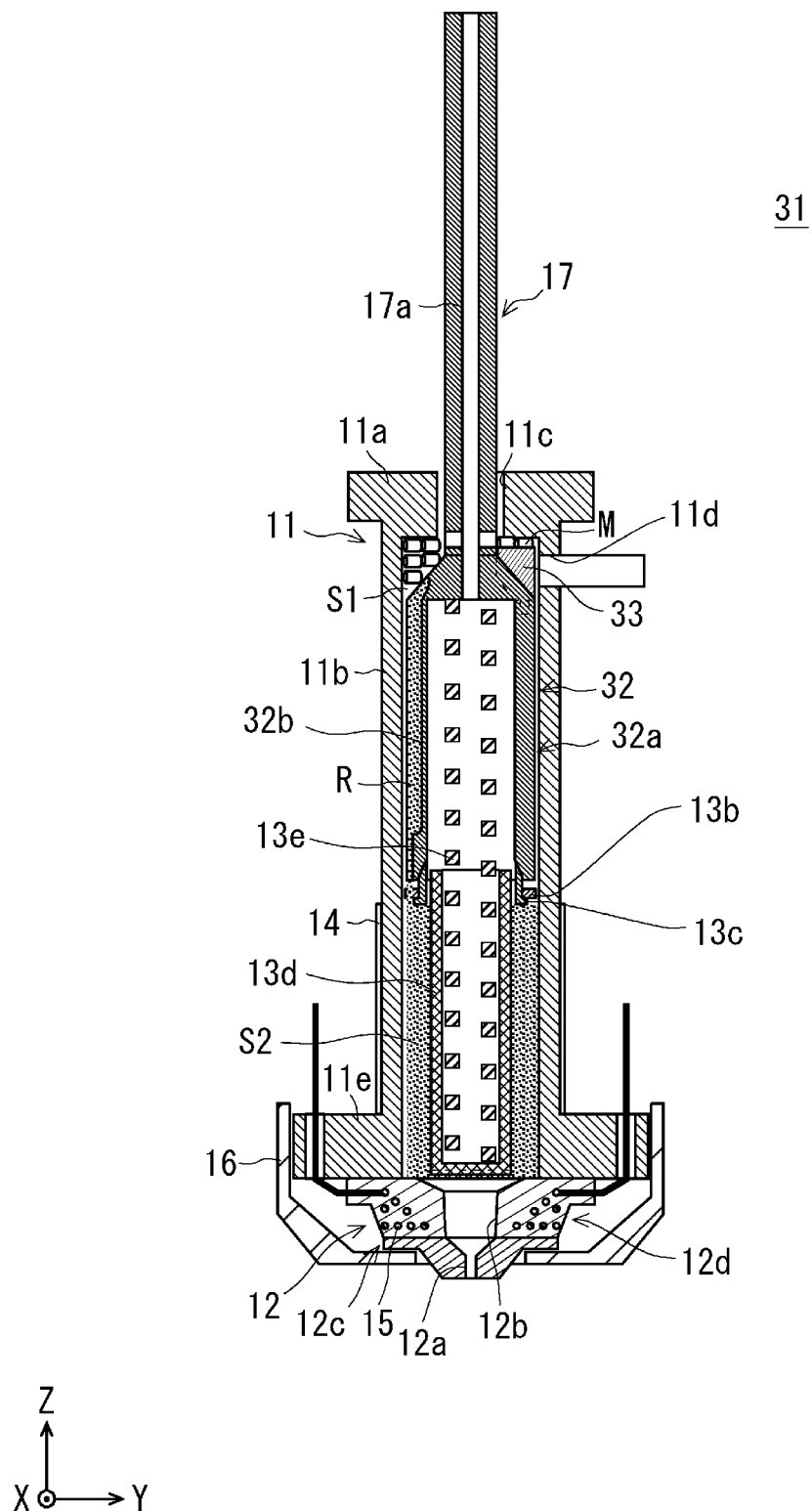
FIG. 14 is a cross-sectional view showing the operation for plasticizing a resin material in the injection molding machine according to the third embodiment.

Next, a flow in which a workpiece is molded using the injection molding machine 31 according to this embodiment will be described. Each of FIGS. 13 and 14 is a cross-sectional view showing an operation for plasticizing a resin material in the injection molding machine according to this embodiment.

First, the resin material M is supplied from the supply hole 11d of the cylinder 11 to the first space S1 of the cylinder 11 while the piston 32 is being moved to the Z-axis negative side via the rod 17 from the place in which the piston 32 is disposed on the most Z-axis positive side.

As shown in FIG. 9, when the piston 32 reaches the most Z-axis negative side, the supply of the resin material M is stopped. Next, as shown in FIG. 13, the piston 32 is moved to the Z-axis positive side via the rod 17.

By the above, the resin material M is compressed by the piston 32, the blocking part 11a of the cylinder 11, and the side wall part 11b of the cylinder 11, is then plasticized while passing through the groove parts 32b of the torpedo piston 32a to become a molten resin R, which then flows into the second space S2 of the cylinder 11. Note that, when the surface of the closing wall 33a of the closing part 33 on the Z-axis positive side is inclined, the resin material M can be properly guided to the groove part 32b of the torpedo piston 32a.

At this time, as described above, since the resin material M according to this embodiment is generally softened only by shearing when it passes through the groove part 32b of the torpedo piston 32a, it is hardly softened, for example, by heating performed by the first heating part 14. Therefore, in the state shown in FIG. 13, the softened molten resin R generally does not flow back from the supply hole 11d of the cylinder 11.

Further, when the piston 32 is moved to the Z-axis positive side via the rod 17, as shown in FIG. 14, the piston 32 does not reach the supply hole 11d of the cylinder 11, the closing part 33 reaches the supply hole 11d, and the closing part 33 closes the supply hole 11d.

As described above, the piston 32 does not reach the supply hole 11d of the cylinder 11 and the closing part 33 closes the supply hole 11d. Thus, it is possible to prevent the molten resin R, which is plasticized by the resin material M passing through the groove part 32b of the torpedo piston 32a, from flowing back from the supply hole 11d.

Next, when the piston 32 reaches the most Z-axis positive side, the piston 32 is made to move to the Z-axis negative side via the rod 17. Thus, the molten resin R is pushed by the piston 32, and the molten resin R is then injected through the communication path 12b and the outlet 12a of the injection part 12.

At this time, when the piston 32 moves to the Z-axis negative side, the engaging piece 33c of the closing part 33 is engaged with the groove part 32b of the torpedo piston 32a between the supply hole 11d of the cylinder 11 and the second space S2 in the Z-axis direction. Thus, it is possible to prevent the molten resin R from flowing back into the first space S1 of the cylinder 11.

As described above, in the injection molding machine 31 and the injection molding method according to this embodiment, like in the injection molding machine 1 and the injection molding method according to the first embodiment, the closing part 33 moves together with the torpedo piston 32a when the torpedo piston 32a moves to the Z-axis positive side in order to plasticize the resin material M. Therefore, the position of the supply hole 11d of the cylinder 11 can be changed as appropriate so that the supply hole 11d of the cylinder 11 is closed by the closing part 33 when the resin material M is softened.

Note that, in this embodiment, although a structure has been described in which the closing part 33 is disposed on the Z-axis positive side with respect to the piston 32, this embodiment can also be implemented by using the piston 13 according to the first embodiment.

Fourth Embodiment

Figure 15:
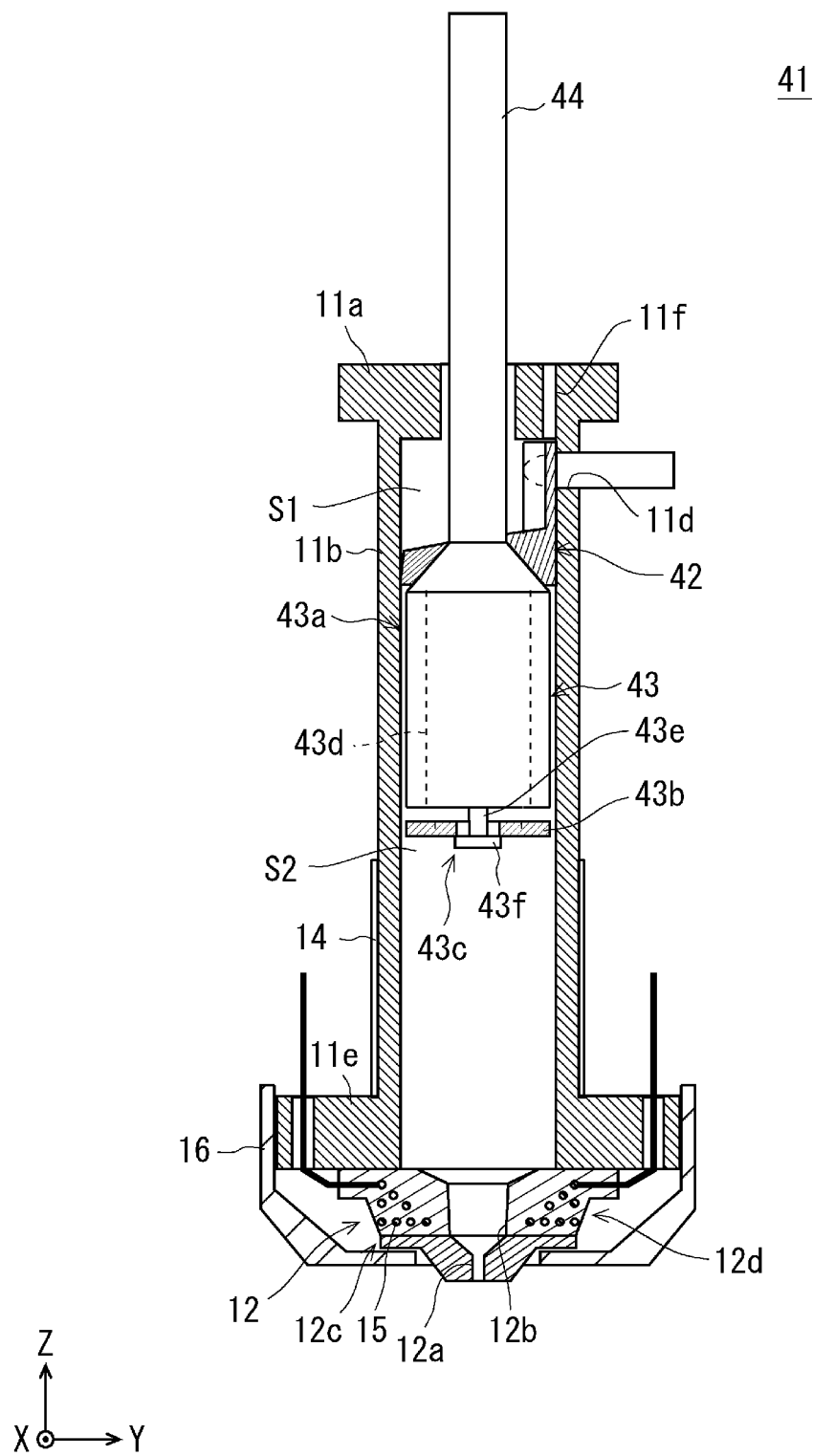
FIG. 15 is a partial sectional view schematically showing an injection molding machine according to a fourth embodiment.
Figure 16:
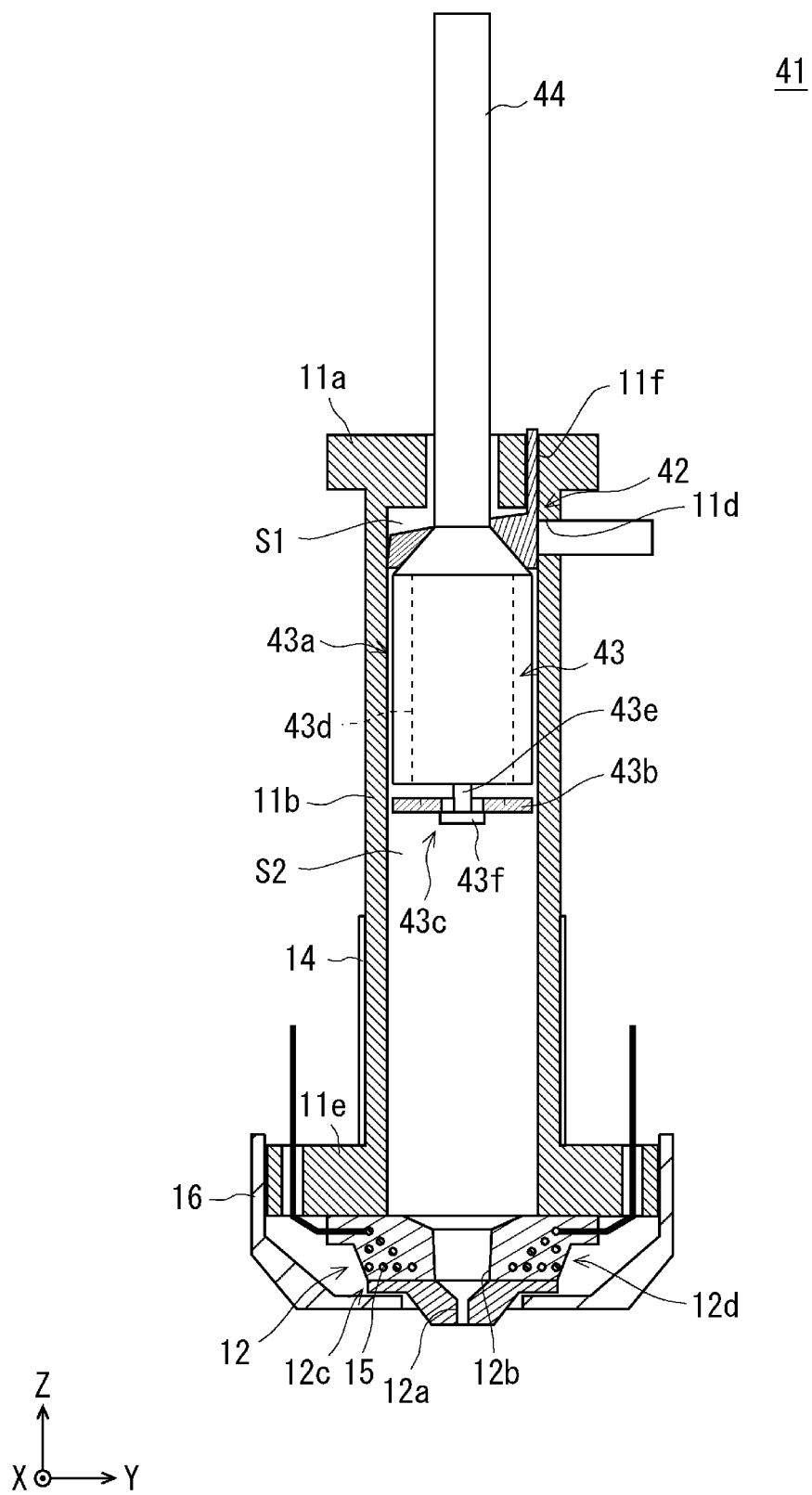
FIG. 16 is another partial sectional view schematically showing the injection molding machine according to the fourth embodiment.
Figure 17:
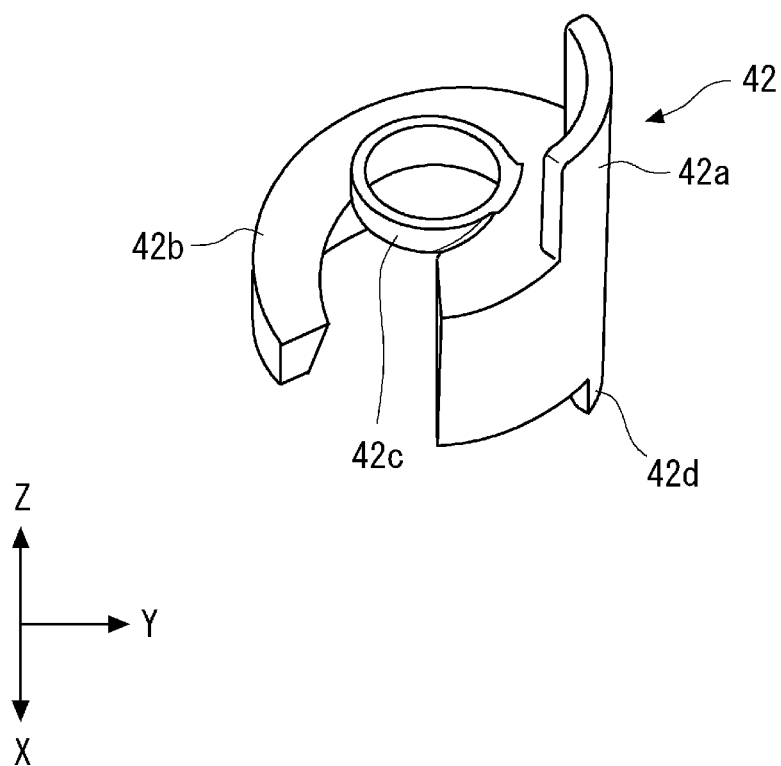
FIG. 17 is a perspective view showing a closing part in the injection molding machine according to the fourth embodiment.

FIG. 15 is a partial sectional view schematically showing an injection molding machine according to this embodiment, and shows a state before an exhaust hole of the cylinder is blocked by an insertion part. FIG. 16 is a partial sectional view schematically showing the injection molding machine according to this embodiment, and shows a state after the exhaust hole of the cylinder is blocked by the insertion part. FIG. 17 is a perspective view showing a closing part in the injection molding machine according to this embodiment.

An injection molding machine 41 according to this embodiment has a structure substantially the same as that of the injection molding machine 31 according to the third embodiment, and thus redundant descriptions thereof are omitted and the same members are described using the same reference symbols. The injection molding machine 41 according to this embodiment is suitably used, for example, when the resin material M of which the glass transition point is lower than that of ABS, polycarbonate, or the like, such as polypropylene and polyamide, is supplied to the first space S1 of the cylinder 11 by an air flow.

For example, when the resin material M is supplied to the first space S1 of the cylinder 11 by an air flow, it is necessary to exhaust gas from the first space S1 of the cylinder 11 while simultaneously preventing the softened resin from being discharged when the gas is being exhausted.

Further, when the supply hole 11d is formed near the end part of the side wall part 11b of the cylinder 11 on the Z-axis positive side so that the resin material M is properly supplied to the first space S1, it is necessary that the supply hole 11d is closed in a state in which the filling rate of the resin material M in the first space S1 has reached 100%.

Therefore, in the injection molding machine 41 according to this embodiment, each of the cylinder 11 and a closing part 42 has a structure that satisfies the above requirement. As shown in FIGS. 15 and 16, the cylinder 11 has a structure substantially the same as that of the cylinder 11 of the injection molding machine 31 according to the third embodiment, except that an exhaust hole 11f that penetrates the blocking part 11a of the cylinder 11 in the Z-axis direction is formed in the blocking part 11a.

As shown in FIG. 17, the closing part 42 includes a closing wall 42a, a guide part 42b, a ring part 42c, and an engaging piece 42d. The closing wall 42a has, as its basic form, a plate body having a thickness and is extended in the Z-axis direction.

The outer circumferential shape (i.e., side) of the closing wall 42a corresponds to the inner circumferential shape (i.e., side) of the cylinder 11. Further, the closing wall 42a is disposed at a position where it can be inserted into the exhaust hole 11f of the cylinder 11 when viewed from the Z-axis direction, and has a circumferential shape substantially equal to that of the exhaust hole 11f.

For example, the height of the closing wall 42a in the Z-axis direction is such that when a piston 43 moves to the Z-axis positive side, the supply hole 11d can be closed until the piston 43 reaches a position on the most Z-axis positive side before the filling rate of the resin raw material M in the first space S1 of the cylinder 11 reaches 100% and the closing wall 42a can be inserted into the exhaust hole 11f of the cylinder 11 after a predetermined period of time has elapsed since the supply hole 11d has been closed (e.g., immediately after the supply hole 11d is closed).

As shown in FIG. 15, the piston 43 according to this embodiment includes a torpedo piston 43a, a non-return ring 43b, and a stopper 43c. The torpedo piston 43a has a pillar shape as its basic form, and the end part of a rod 44 on the Z-axis negative side is fixed to the end part of the torpedo piston 43a on the Z-axis positive side. Note that the rod 44 may not include a through-hole corresponding to the through-hole 17a of the rod 17 according to the first embodiment.

Groove parts 43d are formed on the peripheral surface of the torpedo piston 43a. The groove parts 43d, which are extended in the Z-axis direction, are arranged at approximately equal intervals in the circumferential direction of the torpedo piston 43a.

The non-return ring 43b has a ring shape having an outer circumferential shape that is substantially equal to an inner circumferential shape of the cylinder 11, and is arranged on the Z-axis negative side with respect to the torpedo piston 43a. The stopper 43c holds the non-return ring 43b in the end part of the torpedo piston 43a on the Z-axis negative side.

The stopper 43c includes, for example, a pillar part 43e protruding from the end part of the torpedo piston 43a on the Z-axis negative side and a branch part 43f that is branched radially about the pillar part 43e from the end part of the pillar part 43e on the Z-axis negative side.

In a state in which the pillar part 43e is made to pass through the through-hole of the non-return ring 43b, the non-return ring 43b is arranged between the end part of the torpedo piston 43a on the Z-axis negative side and the branch part 43f. At this time, the length of the pillar part 43e in the Z-axis direction is larger than the thickness of the non-return ring 43b in the Z-axis direction in such a way that the non-return ring 43b can move in the Z-axis direction.

The guide part 42b guides the resin material M in the first space S1 of the cylinder 11 to the groove parts 32b of the torpedo piston 32a. As shown in FIG. 17, the guide part 42b has, as its basic form, a discontinuous cylindrical shape that is formed integrally with a part of the closing wall 42a on the Z-axis negative side. The outer circumferential shape (i.e., side) of the guide part 42b corresponds to the inner circumferential shape (i.e., side) of the cylinder 11.

The surface of the guide part 42b on the Z-axis positive side is spirally inclined in the Z-axis negative side direction toward the counterclockwise (or clockwise) side of the piston 32 in the circumferential direction. Further, the surface of the guide part 42b on the Z-axis negative side is inclined so that it corresponds to the shape of the end part of the torpedo piston 32a on the Z-axis positive side.

The part of the closing wall 42a on the Z-axis positive side protrudes from the surface of the above-described guide part 42b on the Z-axis positive side toward the Z-axis positive side, and the part of the closing wall 42a on the Z-axis positive side functions as an insertion part that blocks the exhaust hole 11f in a state in which it is inserted into the exhaust hole 11f of the cylinder 11.

The ring part 42c is fixed inside the guide part 42b. The ring part 42c includes a penetration part that penetrates in the Z-axis direction, and the inner circumferential shape (i.e., inner circumference) of the penetration part is slightly larger than the outer circumferential shape (i.e., outer circumference) of the rod 17. The engaging piece 42d protrudes from the closing wall 42a toward the Z-axis negative side, and has a shape allowing it to be engaged with the groove part 43d of the torpedo piston 43a.

When the closing part 42 having the above-described structure is fixed to the piston 43, the ring part 42c is passed through the rod 17, the guide part 42b is placed on the torpedo piston 43a, and the engaging piece 42d is engaged with the groove part 43d of the torpedo piston 43a. Then, the ring part 42c is fixed to the rod 17, whereby the closing part 42 can be fixed to the piston 43. However, a means for fixing the closing part 42 to the Z-axis positive side of the piston 43 is not limited.

In a case in which the molten resin R is injected using the above-described injection molding machine 41, when the piston 43 is made to move to the Z-axis positive side and the filling rate of the resin material M in the first space S1 is just short of reaching 100%, the closing wall 42a closes the supply hole 11d. By the above, it is possible to prevent the softened resin from flowing back from the supply hole 11d.

At this time, the exhaust hole 11f of the cylinder 11 is open from when the piston 43 has started moving toward the Z-axis positive side to when a predetermined period of time during which the supply hole 11d is closed by the closing wall 42a has elapsed. Thus, the gas flowing into the first space S1 can be properly discharged in order to supply the resin material M to the first space S1.

Then, when the piston 43 is further moved to the Z-axis positive side, the part of the closing wall 42a on the Z-axis positive side, that is, the insertion part is inserted into the exhaust hole 11f of the cylinder 11, to thereby block the exhaust hole 11f. By the above, it is possible to prevent the softened resin from being discharged from the exhaust hole 11f.

After that, when the piston 43 is moved to the Z-axis negative side, the molten resin R is pushed by the piston 43, and the molten resin R is then injected through the communication path 12b and the outlet 12a of the injection part 12. At this time, the closing wall 42a is removed from the exhaust hole 11f of the cylinder 11.

As described above, by reciprocating the piston 43 in the Z-axis direction, the plasticization of the resin material M and the injection of the molten resin R can be repeated. In this case, the closing wall 42a is repeatedly inserted into and removed from the exhaust hole 11f of the cylinder 11 each time the above reciprocating is performed. Therefore, it is possible to prevent the exhaust hole 11f of the cylinder 11 from being blocked by the solidified resin.

Note that, although the exhaust hole 11f is formed in the blocking part 11a of the cylinder 11 in this embodiment, it may instead be formed in the plunger 23 according to the second embodiment. Further, although the insertion part is formed of the closing wall 42a in this embodiment, it may be provided so as to protrude from the torpedo piston 13a according to the first embodiment toward the Z-axis positive side.

The present disclosure is not limited to the aforementioned embodiments and may be changed as appropriate without departing from the spirit of the present disclosure.

For example, the injection molding machine according to the aforementioned embodiments includes one cylinder, one piston, and the like. However, it may instead include a plurality of cylinders and pistons.

For example, the injection molding machine according to the aforementioned embodiments includes the first heating part 14 and the second heating part 15. However, it may not include them. Further, for example, it may not include the pressurizing piston 13d and the like.

For example, the position of the supply hole of the resin material and the shape and the placement of the closing part are not limited to those described above, and in short, it is sufficient that the supply hole can be closed so that the softened resin material and the molten resin do not flow back from the supply hole when the closing part moves together with the torpedo piston.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An injection molding machine comprising:
a cylinder configured to accommodate a resin material;
a torpedo piston configured to move inside the cylinder to plasticize the resin material, to thereby form a molten resin, and then extrude the molten resin; and
an injection part configured to inject the molten resin, the injection part being disposed in one end part of the cylinder,
the injection molding machine further comprising:
a supply hole through which the resin material is supplied to an inside of the cylinder, the supply hole being formed in a side wall part of the cylinder; and
a closing part configured to, when the torpedo piston moves to a side of an other end part of the cylinder in order to plasticize the resin material, move together with the torpedo piston and close the supply hole;
an exhaust hole configured to communicate a space in the cylinder on the side of the other end part thereof relative to the torpedo piston with an outside; and
an insertion part configured to move together with the torpedo piston and be inserted into the exhaust hole to thereby block the exhaust hole when the closing part closes the supply hole.

2. The injection molding machine according to claim 1, wherein the closing part blocks the supply hole so that a softened resin material or the molten resin does not flow back from the supply hole.

3. The injection molding machine according to claim 1, wherein the supply hole is disposed at a position satisfying $(St-x)/St \leq \gamma$, where St is a stroke amount of the torpedo piston from a bottom dead center to a top dead center, $\gamma$ is a preset filling rate of the resin material, and x is a distance from the other end part of the cylinder to a position at a center of the supply hole.

4. The injection molding machine according to claim 1, wherein the closing part is formed on a side surface of the torpedo piston.

5. The injection molding machine according to claim 1, wherein the closing part is disposed on the side of the other end part of the cylinder relative to the torpedo piston.

6. The injection molding machine according to claim 1, wherein
the other end part of the cylinder is open, and
the injection molding machine comprises a plunger configured to push, via the other end part of the cylinder, the resin material supplied to the inside of the cylinder.

7. An injection molding method for moving a torpedo piston inside a cylinder to plasticize a resin material, thereby forming a molten resin, and then extruding the molten resin, the injection molding method comprising:
closing, when the resin material is plasticized, a supply hole of the resin material by the closing part configured to move together with the torpedo piston, the supply hole being formed in a side wall part of the cylinder; and
closing, when the supply hole is closed by the closing part, the exhaust hole communicating a space in the cylinder on the side of the other end part thereof relative to the torpedo piston with an outside by an insertion part configured to move together with the torpedo piston and be inserted into the exhaust hole.

8. The injection molding method according to claim 7, wherein the closing part blocks the supply hole so that a softened resin material or the molten resin does not flow back from the supply hole.

* * * * *